(No Model.)

E. A. FLETCHER.
MUSIC BLOCK GAME.

No. 595,157. Patented Dec. 7, 1897.

Witnesses

Inventor:
E. A. Fletcher

UNITED STATES PATENT OFFICE.

EVELYN ASHTON FLETCHER, OF TORONTO, CANADA.

MUSIC-BLOCK GAME.

SPECIFICATION forming part of Letters Patent No. 595,157, dated December 7, 1897.

Application filed April 13, 1897. Serial No. 631,970. (No model.)

*To all whom it may concern:*

Be it known that I, EVELYN ASHTON FLETCHER, teacher of music, of the city of Toronto, in the county of York, in the Province of Ontario, Canada, have invented certain new and useful Improvements in Musical Block Games, of which the following is a specification.

My invention relates to an improved musical block game more particularly adapted for the teaching of musical notation to children; and the object of the invention is to design a simple and convenient form of portable staff and musical notes and signs applicable thereto in which notes or signs may be changed at will into different positions on the staff when laid on the table, floor, or flat surface; and it consists, essentially, of a staff preferably consisting of a series of black ribbons or tapes connected to end bars, which are preferably weighty, so that they will hold the ribbons of the staff taut on the floor to represent the lines thereof, the notes and other signs used in music being designed to be placed thereon under the supervision of a teacher or in competition among children themselves.

Figure 1:
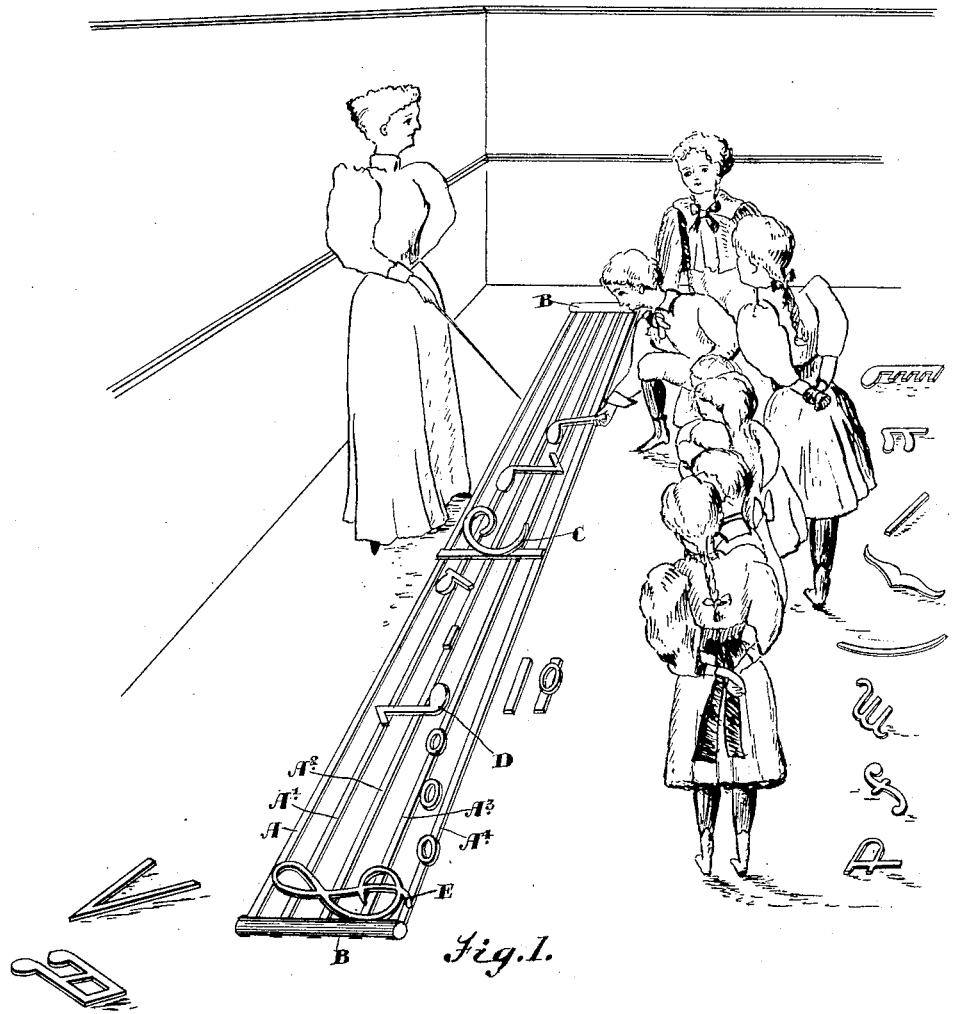
Figure 2:
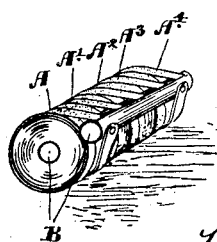

Figure 1 is a perspective view showing the application of my invention, the black tapes or ribbons being placed upon the floor and held taut to represent the lines of the staff by the weighty end bars. Fig. 2 is a perspective view showing the tapes used for the staff and end bars in portable shape.

In the drawings like letters of reference indicate corresponding parts in each figure.

$A$, $A'$, $A^2$, $A^3$, and $A^4$ are the tapes or ribbons representing the five lines of the staff.

B represents the ends.

C, D, and E represent some of the different signs used in musical notation. All of these different notes and signs are in block form. As there are several signs of course I simply exemplify them by a few of the principal ones. The ledger-lines would be represented by separate bars, upon which the notes would be placed the same as on the tapes representing the lines of the staff.

The advantage of my invention will be apparent, as children being taught to play from early infancy with blocks will soon learn how to place the notes and different signs, which I find in practice is a pleasure to them in my game instead of irksome and tedious, as is so commonly the case where they are taught music directly from a music-book in the ordinary way.

What I claim as my invention is—

A game device for teaching music comprising a series of blocks representing the musical characters, and a pair of bars connected only by a series of flexible strips representing a music-scale, said bars being adapted to be laid upon a flat surface a distance apart to stretch said strips upon said surface with the surface as a background, when the device is in use said strips being also adapted to be wound around one or both of said bars when out of use, substantially as described.

EVELYN ASHTON FLETCHER.

Witnesses:
B. BOYD,
A. MCADAM.